United States Patent [19]

Huss, Jr. et al.

[11] Patent Number: 4,933,069

[45] Date of Patent: Jun. 12, 1990

[54] COKE REDUCTION IN CATALYTIC CRACKING

[75] Inventors: Albin Huss, Jr., Chadds Ford; Albert B. Schwartz, Philadelphia, both of Pa.

[73] Assignee: Mobil Oil Corporation, New York, N.Y.

[21] Appl. No.: 250,802

[22] Filed: Sep. 29, 1988

[51] Int. Cl.$^5$ .................. C10G 11/05; C10G 11/18
[52] U.S. Cl. ................................ 208/118; 208/120; 502/77
[58] Field of Search ............... 258/118, 120; 502/77

[56] References Cited

U.S. PATENT DOCUMENTS

| | | | |
|---|---|---|---|
| 3,972,983 | 7/1976 | Ciric | 423/328 |
| 4,021,331 | 5/1977 | Ciric | 208/111 |
| 4,430,200 | 2/1984 | Shihabi | 208/120 |
| 4,477,582 | 10/1984 | Miale | 208/120 |
| 4,481,104 | 11/1984 | Walsh | 502/64 |
| 4,503,023 | 3/1985 | Breck et al. | 502/86 |
| 4,624,774 | 11/1986 | Chang et al. | 208/119 |
| 4,701,313 | 10/1987 | Chang et al. | 502/282 |
| 4,711,770 | 12/1987 | Skeels et al. | 502/79 |
| 4,740,292 | 4/1988 | Chen et al. | 208/120 |

FOREIGN PATENT DOCUMENTS 0243629  11/1987  European Pat. Off. ............ 208/120

*Primary Examiner*—Anthony McFarlane
*Attorney, Agent, or Firm*—Alexander J. McKillop; Charles J. Speciale; Marina V. Schneller

[57] ABSTRACT

A process for increasing the volume of feed throughput to the FCC by decreasing coke make under catalytic cracking conditions including a temperature of 950° F. to about 1150° F., a catalyst to feed ratio of 3:1 to 10:1 and a catalyst contact time of from about 1 to about 20 seconds in the presence of catalyst comprising framework silicon enriched ZSM-20.

11 Claims, 1 Drawing Sheet

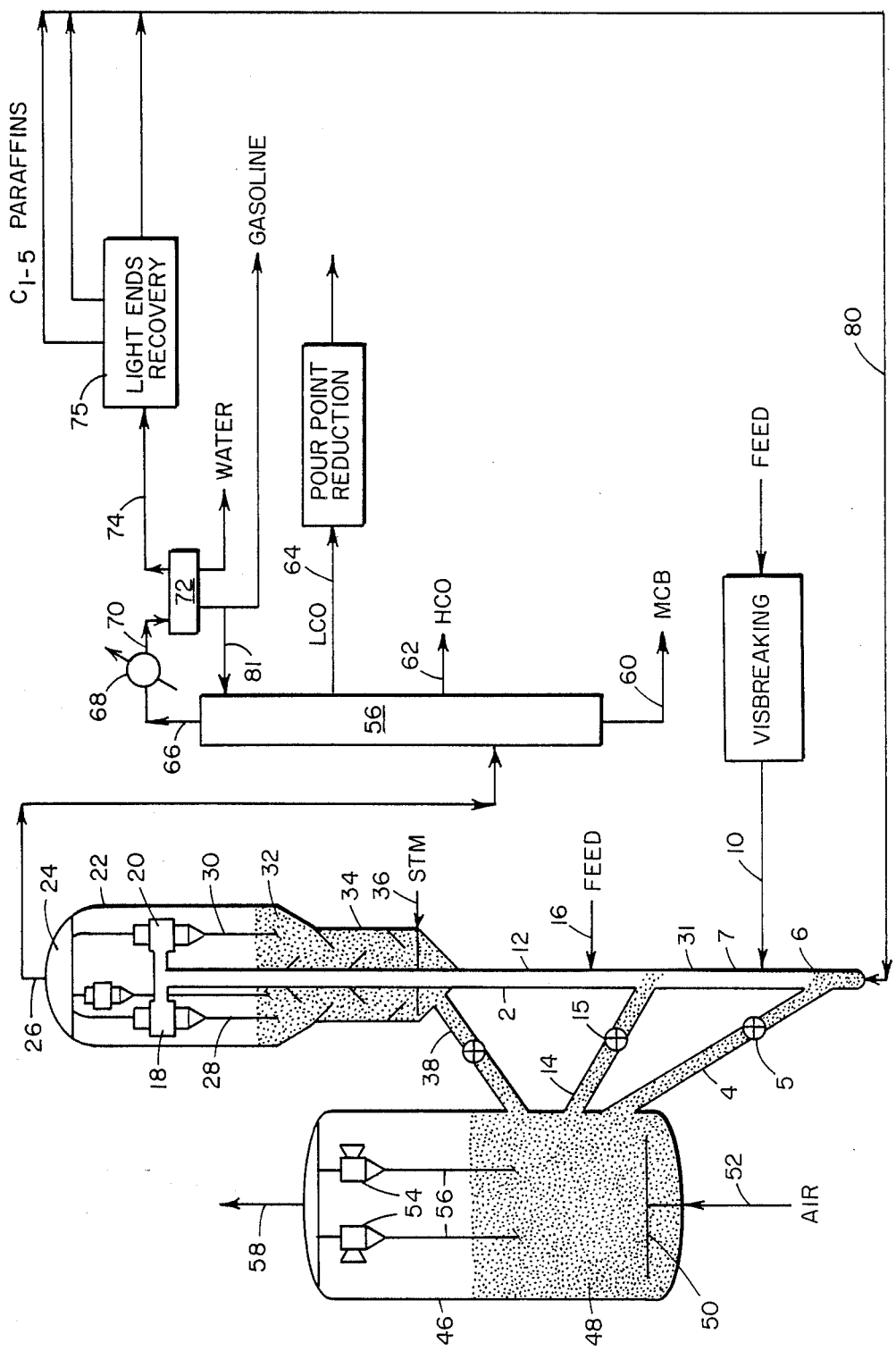

COKE REDUCTION IN CATALYTIC CRACKING

FIELD OF THE INVENTION

The invention relates to a catalytic cracking process under conditions described below in the presence of a catalyst composition comprising silicon enriched ZSM-20. Decreased coke selectivity results in higher hydrocarbon feed throughput and conversion per coke weight produced.

BACKGROUND OF THE INVENTION

The operating conditions in major components in catalytic cracking units are highly interdependent. Coke production is a key factor in the interdependence of the catalytic cracking conditions. To illustrate this point reference is made to G. D. Hobson et al, MODERN PETROLEUM TECHNOLOGY, Applied Science, p 305-308 (1973), which indicates that after considerable experience, it was realized by the petroleum industry that the system was self compensating: "the system was self compensating with regard to heat balance over a wide range of process-operating variables such as feed rate, recycle rate, feed temperature and reactor temperature. This occurs because of the effect of catalyst/oil ratio on conversion, the effect of conversion on the coke yield and the method of reactor temperature control. A rise in feed temperature, for example, will change the heat balance of the reactor so that the reactor temperature tends to rise. As a result, the temperature controller will reduce the catalyst flow from the regenerator, which reduces the catalyst/oil ratio. The effect of this is to reduce the conversion which in turn reduces the yield of coke and thus the heat release in the regenerator. The unit readjusts itself to remain in heat balance at a slightly lower conversion, which can then be restored to its previous value by a slight rise in reactor temperature." The author, G. D. Hobson, explained by way of example: When an increase in the feed temperature occurs a rise of reactor temperature to maintain conversion is required and with a drop of catalyst circulation; the regenerator/reactor temperature differential has increased and the coke yield dropped, which is an important factor in units where coke-burning capacity is a limiting factor. More feed can then be processed to give the same weight of coke production per hour. The reduction in coke yield is due partly to the fact that at a given conversion the coke yield tends to fall as the temperature increases, and partly to the lower catalyst circulation rate which reduces the quantity of entrained hydrocarbon vapours entering the regenerator with the catalyst and being burnt.

In fluidized catalytic cracking processes, a relatively heavy hydrocarbon feedstock, e.g., a gas oil, admixed with a suitable cracking catalyst to provide a fluidized suspension, is cracked in an elongated reactor, or riser, at elevated temperature to provide a mixture of lighter hydrocarbon products. The Basiform reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Some catalytic cracking systems in current operation employ large pore crystalline silicate zeolite cracking catalysts in preference to the earlier used amorphous silica-alumina cracking catalysts. These relatively new crystalline zeolite cracking catalysts, e.g., zeolites X and Y, are generally regarded as low coke producing catalysts. Thus, as the level of coke deposits has been reduced through the use of crystalline zeolite cracking catalysts, it has been equally important to concentrate on recovering the maximum amount of heat available through the burning of deposited coke in the regenerator.

SUMMARY OF THE INVENTION

The invention relates to decreasing coke production in catalytic cracking processes, employing a catalyst composition comprising framework silicon enriched ZSM-20.

Under the conditions described below, increased feed throughput and/or increased conversion is realized by the process of the invention. The significance of the invention resides in the capacity to process more feed to give the same weight of coke yield, which is an important consideration in units where coke-burning capacity is a limiting factor. Since many commercial FCC and TCC units are currently coke or gas compressor limited even when processing gas oil feeds the use of a silicon enriched ZSM-20 catalyst as disclosed herein would:

permit the processing of heavier feeds including resids;

give the refiner greater overall flexibility in unit operating conditions. i.e. permit higher severity operation with a corresponding increased conversion; and produce higher quality gasoline and distillate products.

DESCRIPTION OF THE DRAWING

The attached figure of drawing illustrates a single riser fluidized catalytic cracking process.

DESCRIPTION OF THE INVENTION

Feeds

Hydrocarbon stocks suitable as feeds comprise petroleum fractions having an initial boiling point above 400° F., a 50% point range of at least 500° F. and an end point range of at least 600° F. Such hydrocarbon fractions include gas oils (including vacuum gas oils), thermal oils, residual oils, cycle stocks, whole top crudes, tar sand oils, shale oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

Fluid Catalytic Cracking of the Invention

Conventional cracking catalyst components are generally amorphous silica-alumina and crystalline silica-alumina. Herein the catalyst comprises silicon enricher ZSM-20. ZSM-20 per se is described in U.S. Pat. Nos. 3,972,983 and 4,021,331, each of which is relied upon and incorporated by reference herein.

The ZSM-20 zeolite possesses a definite distinguishing hexagonal crystalline structure whose X-ray diffraction pattern shows substantially the significant lines set forth in Table A.

TABLE A

| d(A) | Relative Intensities |
|---|---|
| 14.90 ± 0.3 | VS |
| 14.21 ± 0.3 | VS |
| 8.67 ± 0.15 | M |
| 8.19 ± 0.15 | W |
| 7.44 ± 0.15 | W |
| 5.66 ± 0.10 | S |
| 5.34 ± 0.10 | W |
| 5.17 ± 0.10 | W |
| 5.00 ± 0.10 | W |
| 4.87 ± 0.10 | W |
| 4.74 ± 0.10 | W |
| 4.33 ± 0.09 | M |
| 3.98 ± 0.08 | W |
| 3.83 ± 0.08 | W |
| 3.76 ± 0.08 | M |
| 3.66 ± 0.07 | S |
| 3.60 ± 0.07 | W |
| 3.55 ± 0.07 | W |
| 3.45 ± 0.07 | W |
| 3.33 ± 0.07 | W |
| 3.29 ± 0.07 | M |
| 3.20 ± 0.06 | W |
| 2.90 ± 0.06 | M |
| 2.87 ± 0.06 | W |
| 2.84 ± 0.06 | M |
| 2.79 ± 0.06 | W |
| 2.75 ± 0.06 | W |
| 2.70 ± 0.05 | W |
| 2.61 ± 0.05 | M |
| 2.41 ± 0.05 | W |
| 2.37 ± 0.05 | W |
| 2.17 ± 0.04 | W |
| 2.14 ± 0.04 | W |
| 2.09 ± 0.04 | W |
| 2.05 ± 0.04 | W |

These values were determined by standard techniques. The radiation was the K-alpha doublet of copper, and a scintillation counter spectrometer with a strip chart pen recorder was used. The peak heights, I, and the position as a function of 2 times theta, where theta is the Bragg angle, were read from the spectrometer chart. From these, the relative intensities, 100 I/Io, where Io is the intensity of the strongest line or peak, and d(obs.), the interplanar spacing in Angstroms (A), corresponding to the recorded lines, wee calculated. In Table I, relative intensities are listed according to the following symbol definitions: VS=very strong, S=strong, M=medium and W=weak. It should be understood that this X-ray diffraction pattern is characteristic of all the species of ZSM-20 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has previously been subjected to thermal treatment.

By the phrase "silicon enriched ZSM-20" we intend to mean framework silicon increase over the as-synthesized ZSM-20, to produce a hydrothermally stable zeolite with a decreased selectivity for coke production. That phrase "silicon enriched" can embrace dealumination of an as synthesized ZSM-20. In U.S. Pat. No. 3,972,983 ZSM-20 (as synthesized) is described to have a silica:alumina mole ratio of 7 to 10, when prepared by the techniques available at the time of the patent. Dealumination is described in the art. However, preferably the phrase "silicon enriched" refers to dealumination and silicon substitution of ZSM-20 to produce a silicon enriched (i.e., higher framework $SiO_2:Al_2O_3$ mole ratio), more hydrothermally stable zeolite. In one art disclosed procedure zeolite dealumination and framework silicon substitution are undertaken in a one-step treatment of the zeolite with a fluorosilicate salt, e.g., $(NH_4)_2 SiF_6$, in aqueous solution, having a pH value of 3 to about 7, in an amount of at least 0.0075 moles per 100 moles of zeolite, at a temperature of 50° to 95° C., as described in U.S. Pat. No. 4,503,023 which is relied upon and incorporated by reference herein. Thereafter, the zeolite can be converted to its protonated (and) form by ammonium ion exchange. In addition to the foregoing materials, the ZSM-20 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zironcia, silica-alumina-magnesia and silica-magnesia-zirconia. The matrix can be in the form of a cogel. A mixture of these components could also be used. The relative proportions of finely divided silicon enriched ZSM-20 and inorganic oxide gel matrix vary widely with the crystalline aluminosilicate content ranging from about 1 to about 90 percent by weight and more usually in the range of about 2 to about 70 percent by weight of the composite.

As a result of the treatment the framework silicon enriched ZSM-20 can have a silica:alumina mole ratio of greater than 7:1, preferably greater than 8:1, and most preferably greater than 10:1.

The major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZX-4 (U.S. Pat. No. 3,314,752), merely to name a few, as well as naturally occurring zeolites such as chabazite, faujasite, mordenite, and the like. Also useful are the silicon-substituted zeolites describes in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and/or large pore crystalline cracking catalysts in the catalyst composition. Preferred optional crystalline zeolite components of the catalyst composition herein include the natural zeolites mordenite and faujasite and the synthetic zeolites X and Y with particular preference being accorded zeolites Y, REY, USY and RE-USY.

A shape selective medium pore crystalline silicate zeolite catalyst can constitute an optional catalyst component of the mixed catalyst system of the invention. Representative medium pore zeolites include ZSM-5, ZSM-11, ZSM-12, ZSM-23, ZSM-35, ZSM-38, ZSM-48 and other similar materials. U.S. Pat. No. 3,702,886 describing and claiming ZSM-5 is incorporated herein by reference. Also, U.S. Pat. No. Re. 29,948 describing and claiming a crystalline material with an X-ray diffraction pattern of ZSM-5 is incorporated herein by reference as is U.S. Pat. No. 4,061,724 describing a high silica ZSM-5 referred to as "silicalite" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,573, the entire contents of which are incorporated herein by reference.

The preferred shape selective crystalline silicate zeolites of the catalyst composition herein are ZSM-5, ZSM-11, ZSM-12, ZSM-23, ZSM-35, ZSM-38 and ZSM-48 with ZSM-5 being particularly preferred.

The silicon enriched ZSM-20 used in the present invention can be modified in activity by dilution with a matrix component of significant or little catalytic activity. It may be one providing a synergistic effect as by large molecule cracking, large pore material and act as a coke sink. Catalytically active inorganic oxide matrix material is particularly desired because of its porosity, attrition resistance and stability under the cracking reaction conditions encountered particularly in a fluid catalyst cracking operation.

The catalytically active inorganic oxide may be combined with a raw or natural clay, a calcined clay, or a clay which has been chemically treated with an acid or an alkali medium or both. The matrix component is combined with the crystalline silicate in such proportions that the resulting product contains up to about 80% by weight of the crystalline silicate material and preferably from about 0.5% up to about 50 weight percent thereof may be employed in the final composite.

Naturally occurring clays which can be composited with the silicon enriched ZSM-20 catalyst include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

The original cations of the as Synthesized ZSM-20 for use herein can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically-active, especially for hydrocarbon conversion. These include hydrogen, hydrogen precursors (e.g. ammonium ions), rare earth metals, aluminum, metals of Groups IB, IIB, IIIB, IVB, VIB, IIA, IIIA, IVA and VIII of the Periodic Table of Elements.

The silicon enriched ZSM-20 zeolite can be used herein either in the tetraethylammonium and alkali metal containing form, the alkali metal form and hydrogen form or another univalent or multivalent cationic form. They can be used in intimate combination with a hydrogenating component such as tungsten, vanadium, molybdenum, rhenium, nickel, cobalt, chromium, manganese, or a noble metal such as platinum or palladium where a hydrogenation - dehydrogenation function is to be performed. Such components can be exchanged into the composition, impregnated therein or physically intimately admixed therewith. Such components can be impregnated into or onto ZSM-20 such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

Typical replacing cations include hydrogen, ammonium, metal cations and mixtures thereof. Of the replacing metallic cations, particular preference is given to cations of metals such as rare earth, Mn, Ca, Mg, Zn, Cd, Pt, Pd, Ni, Co, Ti, Al, Sn, Fe and Co.

Typical ion exchange techniques would include contacting the synthetic ZSM-20 zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite for use herein is then preferably washed with water and dried at a temperature ranging from 150° F. to about 600° F. and thereafter may be calcined.

Suitable charge stocks for cracking in the riser comprise the heavy hydrocarbons generally and, in particular, petroleum fractions having an initial boiling point range of at least about 400° F., a 50% point range of at least about 500° F. and an end point range of at least about 600° F. Such hydrocarbon fractions include gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like.

Referring now to the FIGURE, hot regenerated zeolite ZSM-20 is transferred from regenerator 46 through conduit 4 provided with flow control valve 5 to the lower region 6 of riser 2 where it can combine with a hydrogen-rich hydrocarbon feed, e.g., $C_{1-5}$ light hydrocarbons (paraffins and olefins) recovered from gas plant operation 75, introduced therein through conduit 80. Said feed undergoes thermal cracking in lower region 6 due to the presence of the hot catalyst mixture. Selective catalytic cracking of paraffinic materials can also take place due to the presence of ZSM-5 in the catalyst mixture. The conditions of conversion of the $C_{1-5}$ light hydrocarbon feed in the lower region of riser 31 can include a temperature of from about 900° F. to about 1500° F. and preferably from about 1250° to about 1350° F., a catalyst to feed ratio of from about 50:1 to about 200:1 and preferably from about 100:1 to about 150:1 and a catalyst contact time of from about 10 to about 50 seconds and preferably from about 15 to about 35 seconds. The net result of this thermal/catalytic cracking activity in lower region 6 is to provide mobile hydrogen and/or carbon-hydrogen fragments for addition to the thermally treated heavy hydrocarbon feed introduced further up the riser.

The catalyst-hydrocarbon suspension formed in lower region 6 of riser 2 continues to ascend the riser, it enters an intermediate region 7 and there can be combined with a cofeed introduced to the riser through conduit 10.

In general, the temperature within intermediate region 7 of riser 2 can be maintained within the range of from about 950° to about 1150° F., preferably from about 1000° to about 1100° F., a catalyst to feed ratio of from about 3:1 to about 10:1, preferably from about 4:1 to about 8:1 and a catalyst contact time of from about 0.5 to about 10 seconds, preferably from about 1 to about 5 seconds. The hydrocarbon product/catalyst stream continues upwardly within riser 2 to an upper region 12 thereof where it combines with hot freshly regenerated catalyst transferred from regenerator 46 through conduit 14 provided with valve 15 and optionally with a cofeed such as gas oil introduced through line 16. The conversion conditions in upper region 12 can be essentially the same as those in intermediate region 7. The cofeed introduced via line 16 undergoes cracking in upper region 12 to provide additional quantities of gasoline boiling range material. The catalyst-hydrocarbon suspension continues to travel up the riser and is ultimately discharged into cyclonic separation zones 18 and 20 housed in the upper portion of vessel 22 wherein separation of catalyst from hydrocarbon vapors is accomplished.

Hydrogen, gases and hydrocarbon vapors separated from catalyst then pass into a plenum chamber 24 for removal from the vessel by conduit 26. catalyst separated from hydrocarbon vapors in cyclonic means 18 and 20 pass by diplegs 28 and 30 to a fluid bed of catalyst 32 maintained in the lower portion of the vessel 22. The fluid bed of catalyst 32 is in open communication with a lower extending stripping zone 34 therebelow to which the fluid bed of catalyst moves generally downward countercurrent to rising stripping gas introduced by conduit 36. The stripping zone is maintained at a temperature within the range of 900° F. to 1150° F. and the higher temperature may be facilitated by the addition of hot regenerated catalyst to the catalyst in the stripping zone by means not shown. Stripped catalyst is removed from a bottom portion of the stripping zone by conduit 38 for transfer to regenerator 46.

Catalyst particles comprising particularly the zeolite cracking component of the catalyst composition accumulate a relatively high level of entrained hydrocarbonaceous material therein which is subsequently removed therefrom by regeneration with oxygen-containing regeneration gases. The stripped catalyst particles are passed by conduit 38 to a catalyst regeneration unit represented by regenerator 46 containing a dense fluid bed of catalyst 48. Regeneration gas such as air is introduced to the lower portion of regenerator 46 by air distributor 50 supplied by conduit 52. Cyclone separators 54 provided with diplegs 56 separate entrained catalyst particles from flue gases and return the separated catalyst to the fluid bed of catalyst. Flue gases pass from the cyclones into a plenum chamber and are removed therefrom by conduit 58. Hot regenerated zeolite catalyst is returned to the lower and upper regions of riser 2 by conduits 4 and 14, respectively, as discussed above to participate in another cycle of conversion.

The hydrocarbon products of conversion are conveyed from plenum chamber 24 through conduit 26 and are introduced to fractionation zone 56 where a separation of the products is made. Main column bottoms (MCB) are conveyed from the fractionator by conduit 60 for recycle to riser 2 through conduit 16 or for some other use. A heavy cycle oil (HCO) product is withdrawn by conduit 62. A light cycle oil (LCO) product is withdrawn by conduit 64. An overhead fraction lower boiling than the light cycle oil and comprising gasoline and lower boiling hydrocarbons are withdrawn from an upper portion of fractionator 56 by conduit 66. The withdrawn material in conduit 66 passes through cooler 68 and conduit 70 to knockout drum 72 wherein condensed liquids such as water and gasoline boiling material are separated from lower boiling gaseous components.

The low boiling gaseous components are withdrawn by conduit 74 for passage to a light ends recovery operation 75 wherein a separation is made to recover, $C_{1-5}$ paraffins for recycle through conduit 80. A gasoline boiling range fraction separated in drum 72 is recycled by conduit 81 as reflux to the fractionator tower.

The gas compressor (not shown) in conduit 74 compresses gas from the FCC Which is then directed to the gas recovery plant. It is the volume capacity of that gas compressor inter alia limits FCC throughput. Upgrading heavy hydrocarbon feeds, under the foregoing conditions provides gasoline product and yields higher octane and lower coke than catalysts containing conventional zeolite cracking catalyst.

What is claimed is:

1. In a catalytic cracking process, undertaken in the presence of a large pore size zeolite catalyst, in a catalytic cracking zone, to upgrade a heavy hydrocarbon feedstock to produce gasoline, during which upgrade, coke formation on the large pore size zeolite catalyst occurs, wherein the large pore size zeolite catalyst containing said coke during cracking is conveyed to a regenerator for regeneration and, after regeneration, is reduced in coke content and is conveyed to said zone, the improvement comprising passing a heavy hydrocarbon feed through said zone;
subjecting the feed to catalytic cracking conditions by passing to said zone a catalyst composition comprising, as said large pore zeolite, framework silicon enriched ZSM-20 wherein as-synthesized ZSM-20 is dealuminated to extract aluminum and wherein silicon replaces extracted aluminum in the zeolite framework to produce said framework silicon enriched ZSM-20, wherein catalytic cracking conditions include a temperature of about 950° F. to about 1150° F., a catalyst to feed ratio of 3:1 to about 10:1 and a catalyst contact time of from about 1 to about 20 seconds; whereby the weight of coke formed on the catalyst composition is less than that formed on the large pore size zeolite catalyst;

increasing the feed conversion in said zone so that the coke produced equals, that coke formation on the large pore zeolite catalyst; and recovering upgraded effluent.

2. The process of claim 1, wherein dealumination and silicon replacement includes contacting the as synthesized ZSM-20 with a solution of a salt of hexafluorosilicate; ammonium ion exchanging it; and calcining.

3. The process of claim 1, wherein the framework silicon-enriched ZSM-20 has a silica:alumina ratio of greater than 7.

4. The process of claim 1, wherein the framework silicon-enriched ZSM-20 has a silica:alumina ratio of greater than 9.

5. The process of claim 1, wherein the framework silicon-enriched ZSM-20 has a silica:alumina ratio of greater than 10.

6. The process of claim 1, wherein the framework silica on enriched ZSM-20 is in acid form.

7. The process of claim 1, wherein the framework silicon enriched ZSM-20 is rare earth metal exchanged.

8. The process of claim 1, wherein said process is undertaken in the absence of added hydrogen.

9. The process of claim 1, wherein said catalytic cracking zone is a riser.

10. The process of claim 1, wherein said process is a fluid catalytic cracking process.

11. The process of claim 1, wherein the process is a thermofor catalytic cracking process.

* * * * *